United States Patent [19]

Shirasu et al.

[11] 4,291,224
[45] Sep. 22, 1981

[54] LIGHT IMAGE SPACE FREQUENCY COMPONENT EXTRACTING DEVICE

[75] Inventors: Hiroshi Shirasu, Kawasaki; Akira Ogasawara; Ken Utagawa, both of Yokohama, all of Japan

[73] Assignee: Nippon Kogaku K.K., Tokyo, Japan

[21] Appl. No.: 98,153

[22] Filed: Nov. 28, 1979

[30] Foreign Application Priority Data

Nov. 30, 1978 [JP] Japan .......................... 53-163826[U]

[51] Int. Cl.³ .............................................. G01U 1/20
[52] U.S. Cl. .................................... 250/204; 250/209
[58] Field of Search ............... 250/201, 204, 208, 209, 250/211 J, 578; 357/24; 307/311 D; 354/2 S

[56] References Cited
U.S. PATENT DOCUMENTS

| | | | |
|---|---|---|---|
| 4,133,606 | 1/1979 | Hosoe et al. | 354/2 S |
| 4,189,232 | 2/1980 | Asano et al. | 250/201 |
| 4,218,119 | 8/1980 | Schickedanz | 250/201 |

*Primary Examiner*—David C. Nelms
*Attorney, Agent, or Firm*—Shapiro and Shapiro

[57] ABSTRACT

This invention discloses a device for extracting the space frequency component of an image formed by an optical system. The device comprises means having a photoelectric element array including a plurality of photoelectric elements on which said image is projected and time-sequentially generating, at a predetermined period, a pulse output having a magnitude corresponding to the intensity of light received by each of the photoelectric elements, means for successively storing the respective pulse outputs, means for converting each of the stored pulse outputs into an AC signal, and means for adding together the AC signals and producing the same.

4 Claims, 8 Drawing Figures

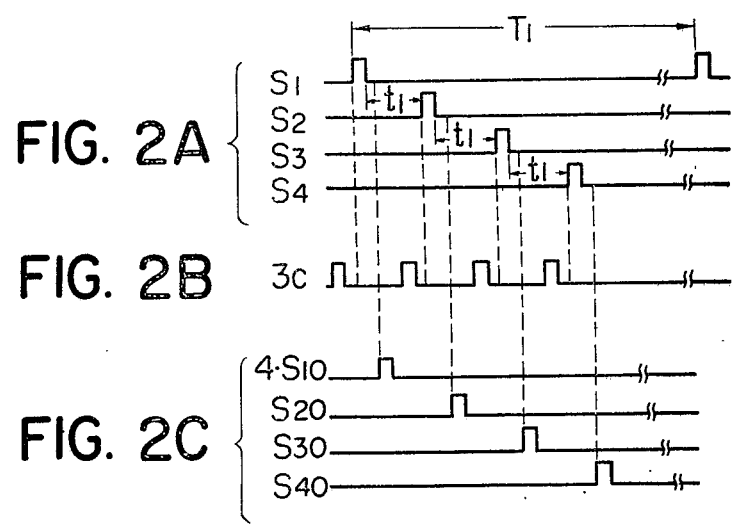
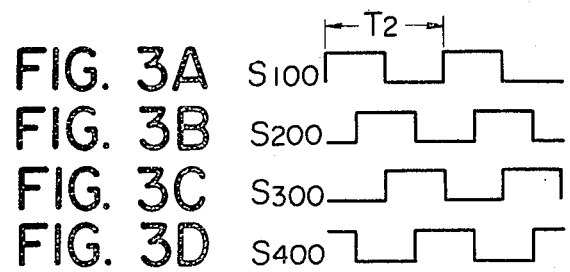

LIGHT IMAGE SPACE FREQUENCY COMPONENT EXTRACTING DEVICE

BACKGROUND OF THE INVENTION

1. Field of the Invention

This invention relates to a device for extracting the space frequency component of an image formed by an optical system.

2. Description of the Prior Art

A technique whereby the outputs of the photoelectric elements of a photoelectric element array on which an image formed by an optical system is projected are converted into AC signals having amplitudes related to the magnitudes of the outputs and having phases successively delayed by $2\pi/N$ (N is a natural number) in the order of arrangement of the elements and such AC signals are applied to thereby extract, from the image, a space frequency component having as the period the spatial length of the N photoelectric elements in the direction of their arrangement has been already proposed, for example, in U.S. application Ser. No. 972,261 and German Application No. 28 56 233.

The outputs of the photoelectric elements are usually small and it is therefore desirably to amplify such outputs and then convert them into said AC signals, but these conversions must take place simultaneously for all the outputs of the photoelectric elements, that is, must be effected in a parallel fashion for all the outputs of the photoelectric elements and this makes it necessary to provide amplifiers in a parallel fashion corresponding to the photoelectric elements for the purpose of the aforementioned amplification. However, where such a plurality of amplifiers are employed, their amplification characteristics must be uniformized and this results in expensiveness of the device.

SUMMARY OF THE INVENTION

It is the object of the present invention to provide a specific space frequency component extracting device in which the outputs of the photoelectric elements may be amplified without the necessity of using a plurality of parallel amplifiers and the amplified photoelectric outputs may be converted into said AC signals in a parallel fashion.

Such object may be achieved by a device for extracting the space frequency component of an image formed by an optical system, which device comprises means having a photoelectric element array including a plurality of photoelectric elements on which said image is projected and time-sequentially generating, at a predetermined period, a pulse output having a magnitude corresponding to the intensity of light received by each of said photoelectric elements, means for successively storing the respective pulse outputs, means for converting each of the stored pulse outputs into an AC signal, and means for adding together said AC signals and putting out the same.

The invention will become more fully apparent from the following detailed description of an embodiment thereof taken in conjunction with the accompanying drawings.

BRIEF DESCRIPTION OF THE DRAWINGS

FIGS. 2A, 2B, 2C, 3A, 3B, 3C and 3D are time charts showing signal waveforms at various points of the circuit shown in FIG. 1.

DESCRIPTION OF THE PREFERRED EMBODIMENTS

Figure 1:
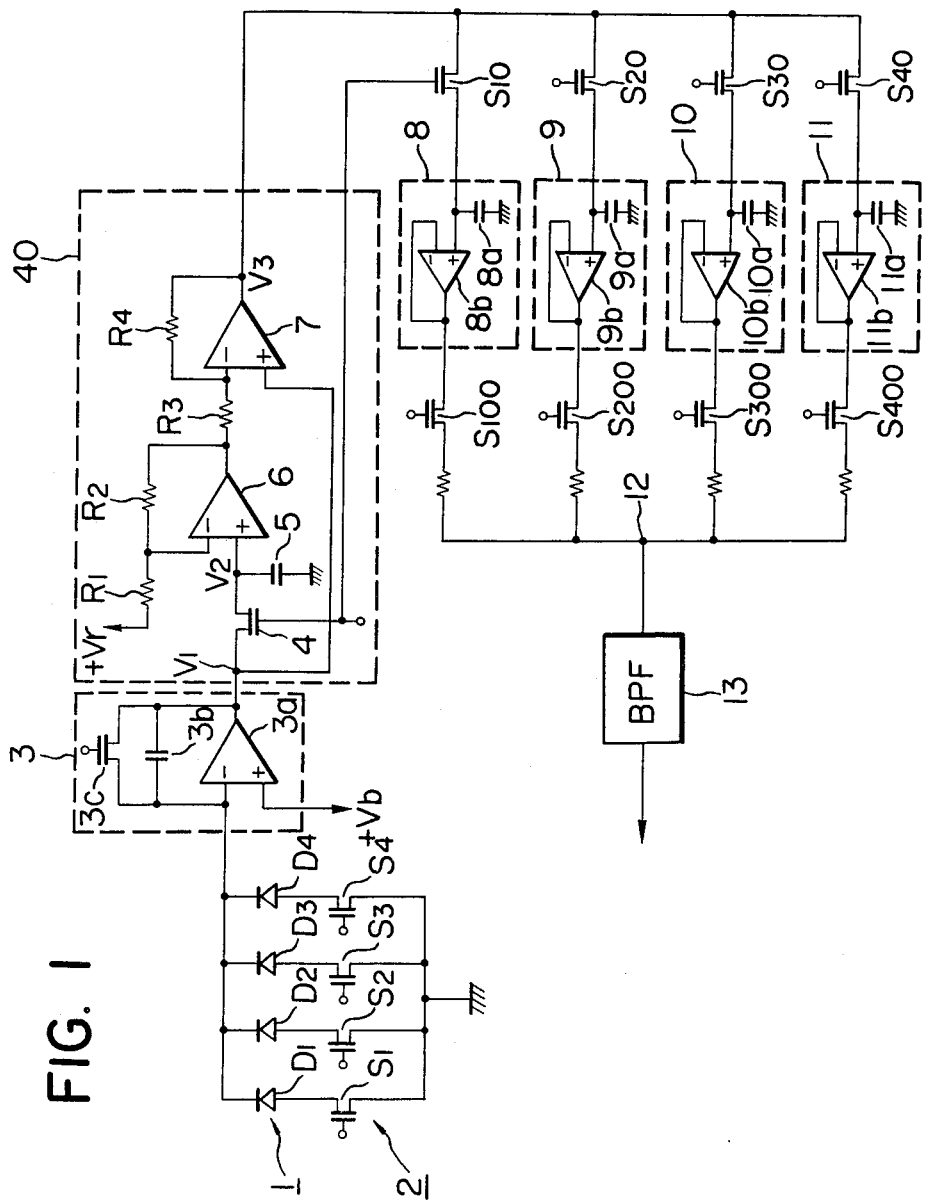
FIG. 1 is a circuit diagram showing an embodiment of the light image space frequency component extracting device according to the present invention.

Referring to FIG. 1 which is a circuit diagram showing an embodiment of the light image space frequency component extracting device according to the present invention, a photodiode array 1 comprising four photodiodes D1–D4 and a switching element row 2 comprising field effect transistors (FETs) S1–S4 are connected to a sampling hold circuit 3 having an operational amplifier 3a, a feedback capacitor 3b and a reset switch 3c, and an amplifier circuit 40 comprising an FET 4, a capacitor 5 and operational amplifiers 6 and 7 is connected to the output of the circuit 3. Hold circuits 8–11 having operational amplifiers 8b–11b are connected to the output of the amplifier circuit 40 through FETs S10–S40.

FETs S1–S4 are caused to conduct momentarily by drive pulses having the same period $T_1$ but having a time delay $t_1$ in succession as shown in FIG. 2A. Thereupon, the charges so far been stored in the pn junctions of the photodiodes D1–D4 in accordance with the light received during the non-conduction of the FETs S1–S4 are successively transferred to the reset switch 3c by the conduction of the FETs S1–S4. The reset switch 3c is caused to conduct by a pulse as shown in FIG. 2B immediately before the conduction of the FETs S1–S4 to discharge the transferred charge from a preceding photodiode and becomes prepared for the transfer of the charge from the next photodiode. Thus, when the FETs S1–S4 successively conduct with a time delay $t_1$, the sampling hold circuit 3 generates output voltages $e_1$–$e_4$ corresponding to the intensities of the light incident on the photodiodes D1–D4.

Operation of the extracting device according to the present invention will not be described. When the FET4 is non-conductive, the output voltage $V_3$ of the amplifier circuit 40 is $$V_3 = G_1 \cdot G_2 \cdot V_r - (1+G_1)G_2 \cdot V_2 + (1+G_2)V_1 \quad (1)$$

where $G_1 = R_2/R_1$, $G_2 = R_4/R_3$, $V_r$ represents a reference voltage, $V_1$ represents the output voltage of the circuit 3 and $V_2$ represents the voltage stored in the capacitor 5.

Here, if resistors $R_1$–$R_4$ are selected such that $G_1 \cdot G_2 = R_2 R_4 / R_1 R_3 = 1$, equation (1) becomes $$V_3 = V_r + (1+G_2)(V_1 - V_2) \quad (2)$$

Here, when the FET S1 conducts, the output voltage $V_1$ of the circuit 3 becomes $V_1 = e_1$ as already described.

Next, when the FETs 4 and S10 conduct at the timing as shown in FIG. 2C, $V_1 = V_2 = e_1$ and from equation (2), $$V_3 = V_r.$$

This is stored in the capacitor 8a of the hold circuit 8 through the FET S10. Next, the circuit 3 is reset by the conduction of the reset switch 3c, whereafter $V_1 = e_2$ upon conduction of the FET S2.

Here, the FET S20 conducts but the FET 4 is non-conductive during that time and therefore $V_2 = e_1$ and from equation (2).

$$V_3 = V_r + (1+G_2)(e_2 - e_1)$$

This is stored in the capacitor 9a of the hold circuit 9.

Then, $V_1 = e_3$ upon conduction of the FET S3 and $V_2 = e_1$ because of the non-conduction of the FET 4 and accordingly, from equation (2), $V_3 = V_r + (1 + G_2)(e_3 - e_1)$. This is stored in the hold circuit 10 upon conduction of the FET S30.

Likewise, upon conduction of the FETs S4 and S40, $V_3 = V_r + (1 + G_2)(e_4 - e_1)$ is stored in the hold circuit 11.

In this manner, the input voltage $V_r$ of the operational amplifier 6 is stored in the hold circuit 8 independently of the value of $e_1$, and the amplified difference between $e_2$ and $e_1$ plus $V_r$ is stored in the hold circuit 9, and the amplified differences between $e_3$ and $e_1$ and between $e_4$ and $e_1$ plus $V_r$ are stored in the hold circuits 10 and 11, respectively.

The amplifier 40 thus amplifies the difference between the photoelectric pulse outputs from the array 1 and therefore, even if the average illumination of the light image is greatly varied, it can accurately operate the device without being affected thereby.

Converter means comprising FETS S100–S400 are connected to the output side of the hold circuits 8–11. These FETs S100–S400 are turned on and off by drive pulses having the same period $T_2$ as shown in FIGS. 3A–3D, but these pulses are successively delayed in phase by $T_2/4$ in the order of arrangement of the photodiodes D1–D4.

Thereby, during the conduction of the FETs S100–S400, currents corresponding to the hold values of the hold circuits 8–11 flow through the respective FETs. In this manner, each photoelectric signal, after amplified, is converted into a rectangular wave AC signal having an amplitude corresponding to its magnitude and having a phase delayed (or advanced) by $2\pi/4$ in the order of arrangement of the photoelectric elements. These currents are all added together by a common conductor 12.

A band-pass filter 13 passing therethrough a frequency of $1/T_2$ is connected to the common conductor 12. Thus, the magnitude of the output of the filter 13 is that obtained by extracting, from the light image on the photodiodes D1–D4, a specific space frequency component, namely, a space frequency component having the length of the four photodiodes in the direction of their arrangement as the space period.

Herein, the period $T_2$ of the drive pulses of the FETs S100–S400 is made smaller than the period $T_1$ of the drive pulses of the FETs S1–S4 and this is because the photoelectric output from one photoelectric element must be converted into said AC signal prior to the generation of the next photoelectric output therefrom after time $T_1$. Desirably, $T_2$ is as great as $t_1$ or several times as great as $t_1$.

In this embodiment, the space period of the space frequency component to be extracted is divided by four photodiodes D1–D4, but this number may be arbitrary and if the space period is divided by N photoelectric elements, the phases of the rectangular wave AC signals will be delayed by $2\pi/N$ each.

We claim:

1. A device for extracting the space frequency component of an image formed by an optical system, comprising:
   (a) means having a photoelectric element array including a plurality of photoelectric elements on which said image is projected and time-sequentially generating, at a predetermined period, a pulse output having a magnitude corresponding to the intensity of light received by each of said photoelectric elements;
   (b) means for successively storing the respective pulse outputs;
   (c) means for converting each of the stored pulse outputs into an AC signal; and
   (d) means for adding together said AC signals and generating the same.

2. The device according to claim 1, further comprising amplifier means provided between said generating means and said store means to amplify said time-sequential pulse outputs.

3. The device according to claim 2, wherein said amlifier means includes means for amplifying the difference between one of said pulse outputs which provides a reference and each of the other pulse outputs.

4. The device according to claim 3, wherein the period $T_2$ of said AC signal is set substantially equal to or in a range several times as great as the predetermined period $t_1$ of said time-sequential pulse outputs.

* * * * *